United States Patent [19]
Ball et al.

[11] Patent Number: 5,215,417
[45] Date of Patent: Jun. 1, 1993

[54] ROTARY RING CUTTER

[75] Inventors: Robert J. Ball, Plymouth; Keith F. Kleinstuber, Kingsbridge; Harry Pearson, Tavistock, all of England

[73] Assignee: The Gleason Works, Rochester, N.Y.

[21] Appl. No.: 872,936

[22] Filed: Apr. 23, 1992

Related U.S. Application Data

[60] Division of Ser. No. 750,346, Aug. 27, 1991, Pat. No. 5,137,402, which is a continuation-in-part of Ser. No. 684,538, Apr. 11, 1991, abandoned.

[51] Int. Cl.$^5$ .............................................. B23F 23/12
[52] U.S. Cl. ................................... 409/234; 409/232
[58] Field of Search ............... 409/38, 39, 232, 233, 409/234; 279/8, 89, 133, 144; 407/21, 28, 29, 64; 51/204, 209

[56] References Cited

U.S. PATENT DOCUMENTS

| | | |
|---|---|---|
| 1,472,565 | 10/1923 | Manning . |
| 2,129,077 | 9/1938 | Wildhaber . |
| 2,371,089 | 3/1945 | Weddell ............................. 409/232 |
| 2,828,672 | 4/1958 | McMullen . |
| 2,994,943 | 8/1961 | Carlsen et al. . |
| 3,041,898 | 7/1962 | Better . |
| 3,136,217 | 6/1964 | Swanson et al. ..................... 409/233 |
| 3,138,996 | 6/1964 | Dammert et al. . |
| 3,531,843 | 10/1970 | Kotthaus ............................ 407/21 |
| 4,061,076 | 12/1977 | Robertson . |
| 4,204,787 | 5/1980 | McCray et al. . |
| 4,575,286 | 3/1986 | Blakesley . |
| 5,137,401 | 8/1992 | Ball et al. ............................ 409/234 |

FOREIGN PATENT DOCUMENTS

| | | |
|---|---|---|
| 3831397 | 3/1989 | Fed. Rep. of Germany ...... 409/234 |
| 0188042 | 8/1986 | Japan . |
| 676563 | 2/1991 | Switzerland . |
| 1399015 | 5/1988 | U.S.S.R. . |

Primary Examiner—Daniel W. Howell
Attorney, Agent, or Firm—Robert L. McDowell; Ralph E. Harper

[57] ABSTRACT

Disclosed herein is a rotary cutter for cutting gears, couplings and the like. The rotary cutter comprises a cutter head having an axis of rotation, a centering disc located adjacent to a side of the cutter head and concentric with the axis and a cutter ring, centered by the centering disc, on the cutter head. The centering disc has a tapered outer edge surface that abuts against and is complementary with the tapered surface of the bore of the cutter ring. The cutter ring is centered once the surfaces are complementary. Once centered, the cutter ring is secured to the cutter head. The rotary cutter of the present invention enables the cutter ring to rotate true about the axis of a machine tool.

23 Claims, 6 Drawing Sheets

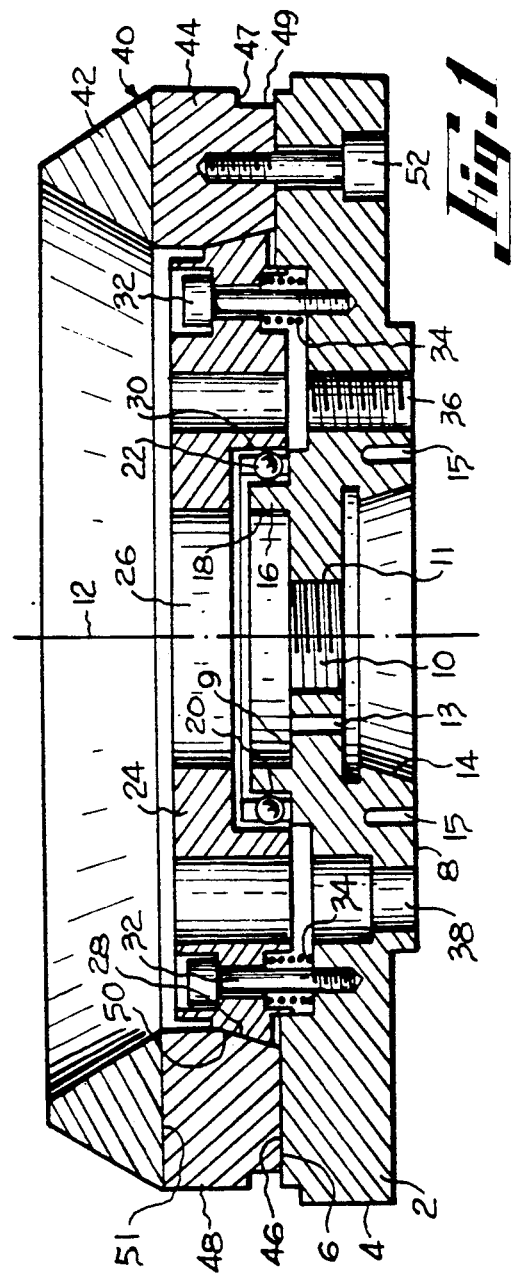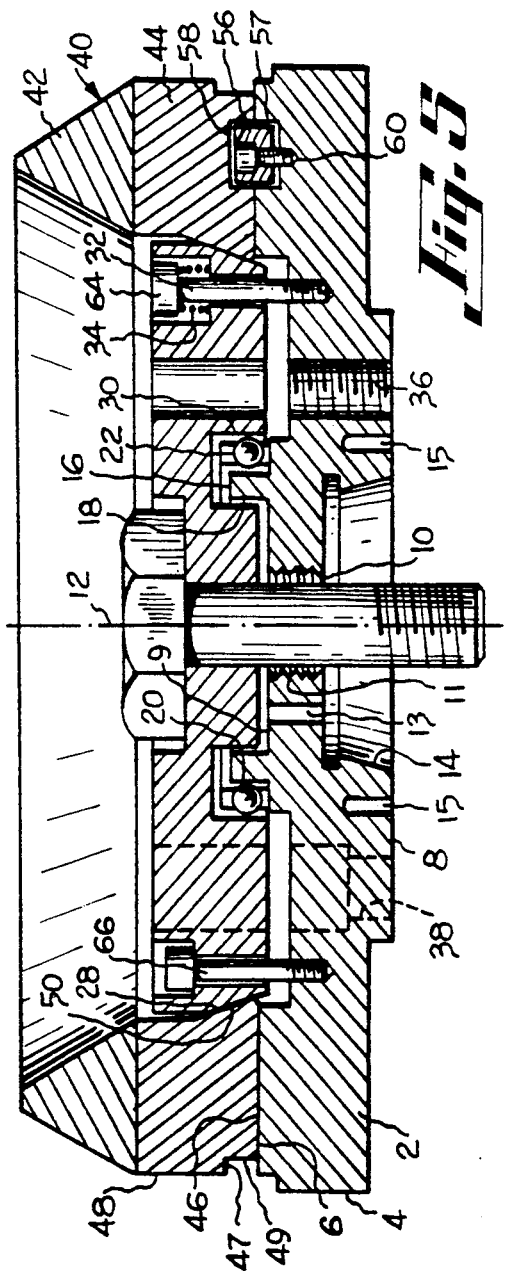

ROTARY RING CUTTER

This application is a divisional of copending application Ser. No. 750,346 filed on Aug. 27, 1991 now U.S. Pat. No. 5,137,402 which is a continuation-in-part of application Ser. No. 684,538 filed on Apr. 11, 1991, abandoned.

FIELD OF THE INVENTION

The present invention is directed to rotary cutters, particularly ring cutters, utilized in the processes of cutting gears, couplings and the like.

BACKGROUND OF THE INVENTION

Solid ring cutters have been known for many years in the art of milling and, in particular, gear cutting. Wildhaber U.S. Pat. No. 2,129,077 discloses a solid ring cutter mounted to the nose of a cutter spindle. The solid ring cutter is stated to be very stiff due to the continuous ring and accurately concentric due to the fact that the teeth are ground in place.

It can be seen that producing the teeth of the ring cutter in place is advantageous since this approach eliminates the need to assemble a cutter by placing and positioning individual blades in a cutter head, such as illustrated by Blakesley U.S. Pat. No. 4,575,286, or mounting blades about the periphery of a cutter head, such as illustrated by Carlsen U.S. Pat. Nos. 2,994,943 et al. or Dammert et al. 3,138,996.

However, mounting a cutter ring on a spindle as disclosed by previously mentioned U.S. Pat. No. 2,129,077 or mounting a cutter ring on a cutter head as disclosed by McMullen U.S. Pat. Nos. 2,828,672 or McCray et al. 4,204,787 requires a precise fit of the cutter ring base and side mounting surfaces to the mounting surfaces of the spindle or head. Any dimensional changes of the cutter ring, such as diameter changes due to temperature variations, will result in the cutter ring and the surface to which it is to be mounted to lose the precise fit required for proper operation of the cutter. Proper operation being the ability of the cutter ring to rotate true about the axis of rotation of the spindle. A cutter ring produced at one temperature and then transported to another location having a different temperature will expand or contract accordingly. The diameter of the cutting ring will not be the same as when produced and will not precisely fit the intended mounting surface.

Producing the cutter ring and mounting surface under the same conditions does not solve the imprecise fit condition since usually the cutter ring is made from a cutting tool steel and the head to which it is to be mounted is made from a non-cutting tool steel. These materials most likely will not expand nor contract equally and therefore exposing the cutter ring and mounting surface to a temperature different than that at production will also ruin the precise fit of the cutter ring on the mounting surface.

It is an object of the present invention to provide a rotary ring cutter wherein the cutter ring will be concentric with the axis of rotation of the rotary cutter regardless of dimensional changes effected by exposure of the cutter ring to differing environmental conditions.

It is another object of the present invention to provide a rotary ring cutter which offers rapid assembly and disassembly as well as repeatable accurate placement of a cutter ring on the cutter head.

SUMMARY OF THE INVENTION

The present invention is directed to rotary cutters for cutting gears, couplings and the like such as by milling, hobbing or grinding, and in particular to rotary cutters having a solid, one-piece cutter ring comprising a circular base portion with at least one stock removing surface located thereon. The present invention enables a cutter ring to be centered on a cutter head and to thereby rotate true in both the radial and axial planes about an axis of rotation during a gear forming process.

The present invention comprises a disc-shaped cutter head having an outer edge surface and first and second sides located, respectively, on the front and back faces of the cutter head. The cutter head has a central opening therethrough which may be concentric with the axis of rotation of the rotary cutter. Projecting from the cutter head is a projecting portion which encircles the central opening and the axis of rotation. The projecting portion has an inner surface, located closest to the central opening, and an outer surface with at least the outer surface being perpendicular to the first side and concentric with the axis of rotation. Extending about the outer surface of the projecting portion is a ball and cage arrangement.

A disc-shaped centering disc is located adjacent the first side of the cutter head. The centering disc has a central opening therethrough which may be concentric with the axis of rotation. The centering disc also comprises a recessed region having a circular inner recess wall surface encircling the central opening of the centering disc. The circular inner recess wall surface is concentric with the axis of rotation of the rotary cutter and is located about and in an interference fit with the ball and cage arrangement thus centering the centering disc on the cutter head. The centering disc includes a tapered outer edge surface which is concentric with the circular inner recess wall surface.

A cutter ring having stock removing surfaces is secured to the cutter head. The stock removing surfaces are located on a circular base portion wherein the base portion comprises a base surface adjacent to the first side of the cutter head, an outer ring surface located near the outer edge surface of the cutter head and a tapered inner cutter ring surface. The inner ring surface is complementary to the tapered surface of the centering disc whereby placement of the cutter ring on the centering disc centers the cutter ring on the cutter head.

BRIEF DESCRIPTION OF THE DRAWINGS

FIG. 1 schematically illustrates a preferred embodiment of the present invention wherein an outwardly tapering centering disc is utilized to center a cutter ring having an outwardly tapering inside ring surface.

FIG. 5 illustrates an alternative embodiment of the present invention whereby an inwardly tapering centering disc is utilized to center a cutter ring having an inwardly tapering inside ring surface.

DETAILED DESCRIPTION OF THE INVENTION

Figure 2:
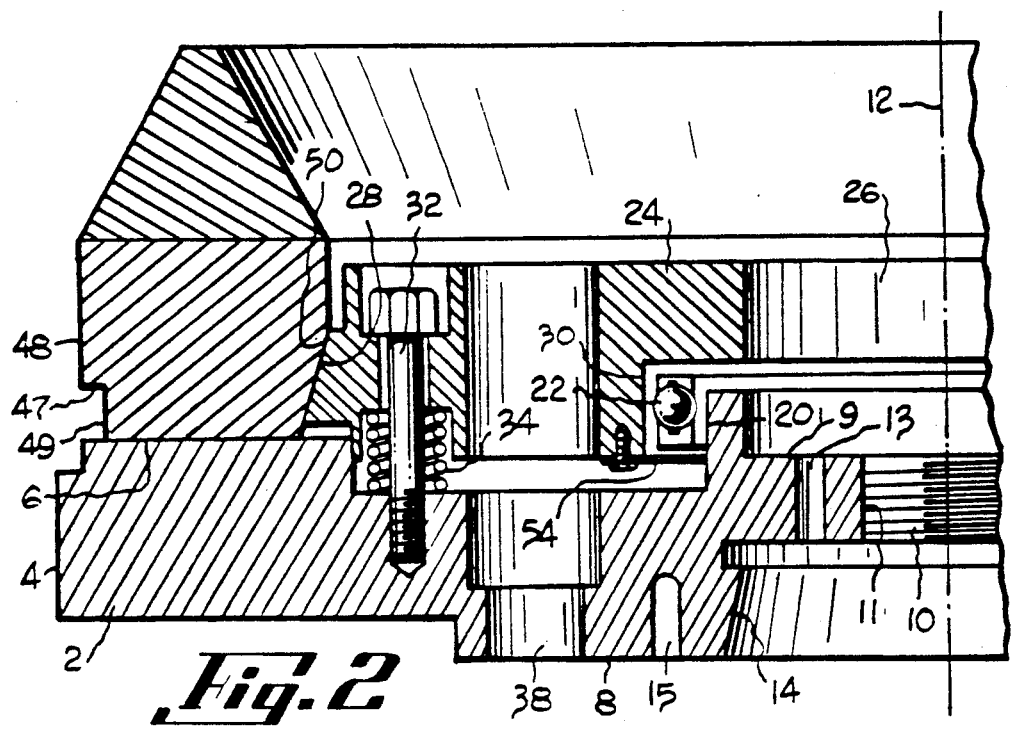
FIG. 2 illustrates a retaining means for maintaining a ball and cage arrangement in place in the centering disc.

The present invention will be discussed with reference to the accompanying Drawings which represent the invention by way of example only.

FIG. 1 illustrates a cross-sectional view of a preferred embodiment of the present invention. The rotary cutter may be utilized for roughing and/or finishing operations and comprises a disc-shaped cutter head 2, preferably made of a non-tool steel, comprising an edge surface 4 and including a first side 6 and a second side 8 with sides 6 and 8 being parallel to one another. The cutter head 2 also comprises a central opening 10 arranged about an axis 12 which is the axis of rotation of the rotary cutter. Central opening 10 may be arranged concentrically with axis 12. The axis 12 coincides with the axis of rotation of a machine tool spindle (not shown) to which the rotary cutter is to be mounted. In mounting the rotary cutter to a machine tool spindle, the tapered bore 14, which is concentric to axis 12, engages the machine tool spindle nose and the second side 8 abuts against the face of the spindle such that second side 8 is perpendicular to the axis 12. The spindle face may include a key which is inserted into a keyway (not shown) in the surface 8 to assist in the transmittal of torque from the spindle face to the cutter head 2. A bolt (not shown) extends from seating surface 9 through central opening 10 and is threaded into the end of the spindle nose. Cutter head 2 may include a stress-relieving groove 15 located in the second side 8 and extending about and radially outward from the tapered bore 14. The groove 15 reduces the stresses associated with securing the cutter head to the machine spindle and in doing so reduces the wear of the tapered bore 14. The cutter head 2 also includes a projecting portion 16 encircling the opening 10 and axis 12. The projecting portion 16 has an inner surface 18 and an outer surface 20 with at least the outer surface 20 being perpendicular to side 6 and concentric with the axis 12. Extending about projecting portion 16 is a ball and cage arrangement 22 having uniformly sized balls of a predetermined diameter, for example, about one fourth (¼) inch. Although FIG. 1 shows one row of balls in the ball and cage arrangement 22 it is to be understood that more than one row of balls may be utilized.

Located adjacent to the first side 6 of cutter head 2 is disc-shaped centering disc 24 which along with the cutter head 2 comprises a mounting assembly for a cutter ring. The disc-shaped centering disc 24, also preferably made of a non-tool steel, comprises a central opening 26 which may be concentric with axis 12, tapered outer edge surface 28 and a circular recessed region having a circular inner recess wall surface 30. Wall surface 30 and outer edge surface 28 are located concentrically about axis 12.

Surfaces 20, 28, and 30 are precisely manufactured, for example, by grinding, such that placement of the ball and cage arrangement 22 about outer surface 20 followed by placement of circular inner recess wall surface 30 about ball and cage 22 will create an interference fit thereby precisely positioning ball and cage 22 concentric with projecting portion 16 and centering the disc 24 on cutter head 2. Means, such as shoulder screws 32, spaced around centering disc 24 hold, but do not clamp, centering disc 24 and cutter head 2 together.

Located between the centering disc 24 and cutter head 2 are resilient means, such as springs 34, which resiliently urge centering disc 24 spaced away from cutter head 2. Preferably the springs 34 are located at the same locations as shoulder screws 32 with the screws 32 passing therethrough.

Also spaced about the centering disc 24 and extending therethrough as well as through the cutter head 2 is at least one access hole 36 for placement of an ejector screw (not shown), for removing the rotary cutter from a machine tool spindle. The portion of the access hole 36 which extends through cutter head 2 is tapped in order that the ejector screw may be threaded thereinto. Alternatively, for machines having a narrow spindle face, central opening 10 may include threads 11 for an ejector screw. Also, at least one other access hole 38 may be included for alternative or additional mounting bolts (not shown) for securing the rotary cutter to the spindle of a machine tool.

Secured and centered on cutter head is cutter ring 40. Cutter ring 40 comprises at least one stock removing surface 42, such as a grinding surface made of, for example, aluminum oxide or cubic boron nitride (CBN), or cutting blades made of, for example, high speed steel, powder metal, carbides or ceramics. The stock removing surface 42 may be removably attached to circular base portion 44 made of, for example, high speed steel or the stock removing surface 42 and circular base portion 44 may be formed as a singular unit such as by casting or milling from a solid piece of metal. The base portion 44 includes a base surface 46, outside ring surface 48, tapered inside ring surface 50 which extends to the base surface 46, and top surface 51. As can be clearly seen in FIG. 1, stock removing surfaces 42 are arranged on the top surface 51 of circular base portion 44, top surface 51 being located opposite the base surface 46. The tapered inside ring surface 50 of cutter ring 40 abuts against and is complementary with the tapered outer edge surface 28 of centering disc 24. The amount of taper of the inside ring surface 50 and the outer edge surface 28 being about two (2) degrees to about twenty (20) degrees. In FIG. 1 tapered inside ring surface 50 is tapered outwardly in a direction toward base surface 46 of base portion 44 or toward surface 6 of cutter head 2 and tapered outer edge surface 28 is tapered outwardly in a direction toward base surface 46 of base portion 44 or toward surface 6 of cutter head 2.

Surfaces 47 and 49 are known as proof surfaces and extend, respectively, perpendicular and parallel to the axis of rotation 12 of the cutter ring 40. The proof surfaces are precisely formed on the cutter ring and extend completely therearound. These surfaces are used during the manufacture of the cutter ring 40 to ensure that the cutter ring is correctly loaded onto the heads of machines utilized to produce them. Any foreign material, such as dirt, between the cutter ring and the machine head or any damage to the ring will cause run-out in the rotation of the cutter ring, that is, the cutter ring will not rotate concentrically about its axis of rotation. Gauges (not shown) contacting proof surfaces 47 and 49 indicate any deviations from concentricity about the axis of rotation during the manufacture of the cutter ring 40. The proof surfaces 47 and 49 may also be used after assembly of the ring cutter or after the ring cutter is mounted to the spindle of a machine tool in order to check for deviations from concentricity. As with manufacture, dirt located between adjacent mounting surfaces or damage to the mounting surfaces may cause the cutter ring 40 to depart from concentricity about the axis of rotation 12.

When cutter ring 40 is placed on centering disc 24, the ring 40 will position itself complementary to the precisely formed, tapered outer edge 28 of centering disc 24 at some location along outer edge 28 depending upon the diameter of the cutter ring 40. A smaller diameter will result in the cutter ring 40 being positioned nearer the top (referenced from cutter head 2 in FIG. 1) of outer edge surface 28 while a larger diameter will result in the cutter ring 40 being positioned nearer to the bottom of outer surface 28. Stated another way, a smaller diameter cutter ring, when centered on centering disc 24, will have a base surface 46 spaced further away from the first side 6 of cutter head 2 than a larger diameter cutter ring which, when centered, will have a base surface located closer to the first side 6 of cutter head 2. It can be clearly seen, therefore, that regardless of the diameter variation of cutter ring 40, the cutter ring will always be centered by centering disc 24 and in turn centered on cutter head 2 thus resulting in true rotation about axis 12.

The resilient means, such as the springs 34, hold the centering disc 24 away from the cutter head 2 thus allowing the cutter ring 40 to find a centered position without interference from the cutter head 2. Once centered by the centering disc 24 on cutter head 2, means, such as at least one screw 52 spaced about the cutter head 2, are utilized to secure the cutter ring 40 to the cutter head 2. The screws 52 extend through the cutter head 2 into the base portion 44 of the cutter ring 40. Wide bores in the cutter head 2 and wide, deep threads in the screws 52 and base portion 44 allow for radial position changes of the cutter ring 40 on the cutter head 2 due to dimensional changes of the cutter ring 40.

Surfaces 6, 8 and 46 are precisely formed, such as by grinding, to be perpendicular to the axis 12 and the face of a machine tool spindle so that when cutter ring 40 is secured to cutter head 2 by screws 52 and mounted to a machine tool spindle, the rotary cutter will rotate true in the axial plane of a machine tool spindle axis. Since the cutter ring 40 is also centered on the cutter head 2 the rotary cutter will also rotate true in the radial plane of the machine tool spindle axis. Changes in the cutter ring diameter due to temperature variations, such as manufacturing the cutter ring in a cool environment and utilizing it in a hot environment, will be accommodated for by the centering disc 24 thus ensuring precise centering of the cutter ring 40 on the cutter head 2 and true rotation about axis 12.

The rotary cutter of FIG. 1 is assembled by placing the ball and cage arrangement 22 about projecting portion 16. Alternatively, the ball and cage arrangement 22 may be placed in the centering disc 24 next to surface 30. This alternative positioning (See FIG. 2) usually requires at least one retaining means, such as a thin metal strip 54, to be placed on the centering disc 24. FIG. 2 has been enlarged to show detail. The retaining means extends inwardly past the inner recess wall surface 30 in order to retain ball and cage arrangement 22 in contact with wall surface 30 prior to assembly of the rotary cutter. The metal strip 54 may also be in the form of a continuous ring-shaped strip completely encircling and extending inwardly of the inner recess wall portion 30. The centering disc 24 is then placed on the head 2 and held spaced from the head 2 by the screws 32 and springs 34. The cutter ring 40 is then placed on the centering disc 24 and secured to the cutter head 2 by the screws 52. In most cases, when screws 52 are tightened, the rotary cutter must be turned upside down in order to access the heads of the screws 52 on the opposite side of the cutter head 2. Usually, the seating surface 9 of the rotary cutter is placed against the face of a spindle-like device (not shown) that comprises a material, such as rubber, that will not mar the surfaces of the rotary cutter. Projecting from the face of the spindle-like device is a pin (not shown) which is inserted into the hole 13. The presence of the pin in the hole 13 prevents the rotary cutter from rotating as the screws 52 are tightened.

Figure 3:
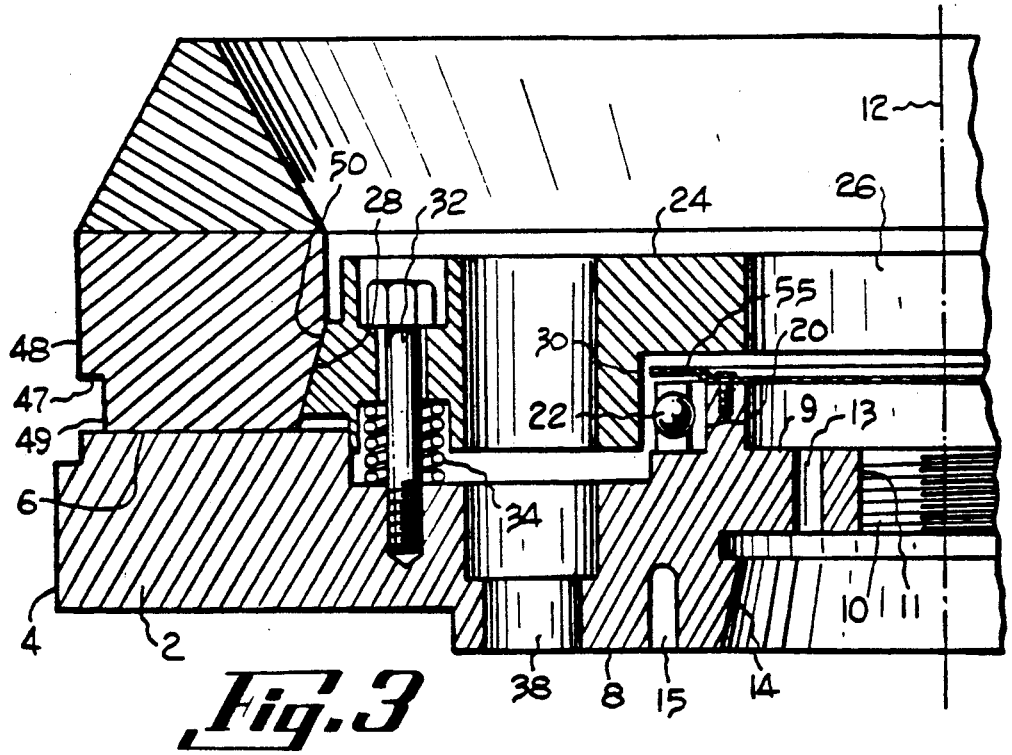
FIG. 3 illustrates a retaining means for maintaining a ball and cage arrangement in place about the projecting portion of the cutter head.

When the ball and cage arrangement 22 is placed about the projecting portion 16, retaining means may be included to prevent the ball and cage arrangement 22 from losing contact with the projecting portion 16 upon the removal of the centering disc 24 from the cutter head 2. One type of retaining means is shown in FIG. 3 which has been enlarged to show detail. A retaining strip 55, such as a thin metal strip, is secured to the projecting portion 16 to prevent movement of the ball and cage 22 beyond the end of the projecting portion 16.

Figure 4:
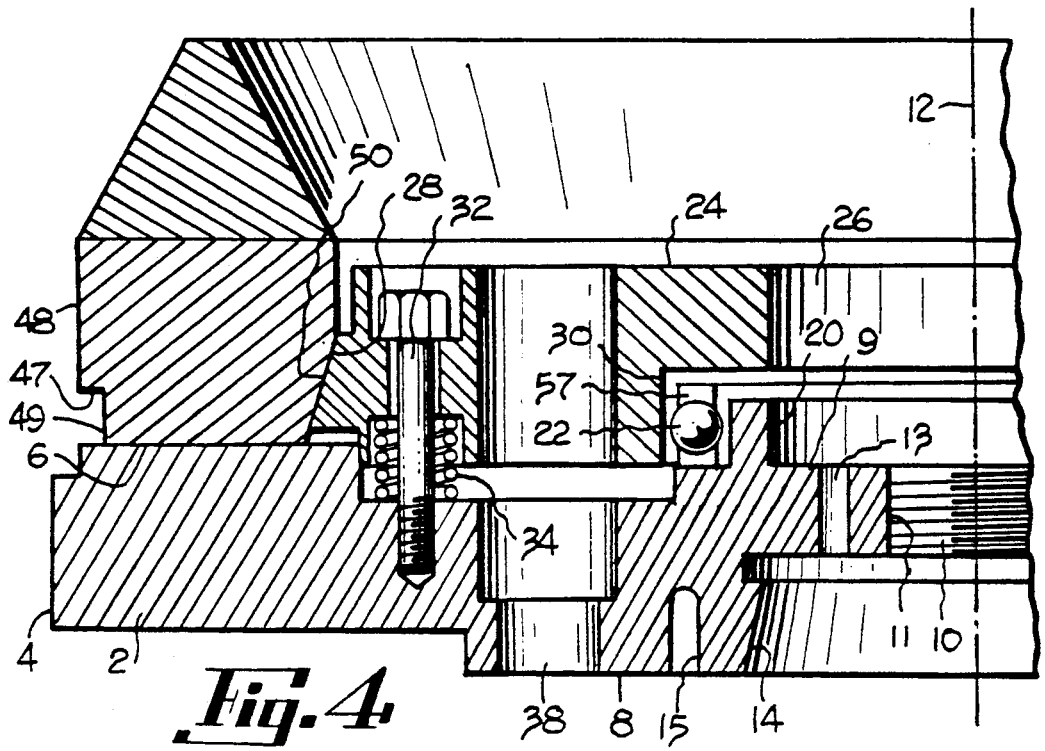
FIG. 4 shows a ball and cage arrangement having an lengthened cage portion to prevent the loss of contact with the projecting portion.

Alternatively, as shown in FIG. 4, the portion 57 of the cage, in the ball and cage arrangement 22, between the balls and centering disc 24 may be lengthened, that is, made longer than the portion of the cage located between the balls and the cutter head 2. This ensures that movement of the ball and cage 22 will not result in the ball and cage losing contact with the projecting portion 16 such as when the cutter ring 40 is replaced. Continual removal and replacement of cutter rings results in the centering disc 24 repeatedly moving away from and then toward the cutter head 2. In some instances, without a retaining means present, there is a tendency of the ball and cage arrangement 22 to creep along the projecting portion 16 and eventually lose contact therewith. Lengthening the cage portion 57 allows the ball and cage arrangement 22 to move only a short distance until the end surface of the lengthened portion 57 contacts the centering disc 24 thus preventing any further movement and keeping the ball and cage 22 in contact with the projecting portion 16. In a similar manner, the thin strip 55 as shown in FIG. 3 would also prevent any excessive creeping of the ball and cage arrangement 22 along the projecting portion 16.

The ball and cage arrangement 22 of the present invention may also include at least one resilient means, such as at least one spring, to urge the ball and cage away from the centering disc 24 or away from the cutter head 2, depending upon the preassembly location, when the centering disc 24 is not in contact with the cutter head 2. The resilient means may be utilized with or without the retaining means 54, 55 or 57. In this manner, as the centering disc 24 is placed on the cutter head 2 and/or the cutter ring 40 is drawn down onto the first side 6 of the cutter head 2, such as by the screws 52, the centering disc 24 will roll down with the ball and cage 22 thus preventing skidding of the balls and marking of the surfaces 20 and/or 30.

An alternative embodiment of the present invention is shown in FIG. 5 wherein elements similar to those previously discussed with reference to FIG. 1 are indicated with the same reference numbers.

In FIG. 5 the directions of the taper on the centering disc 24 and the cutter ring 40 are reversed from the direction as described in FIG. 1. The outer edge surface 28 of centering disc 24 tapers inwardly in a direction toward base surface 46 of base portion 44 or toward surface 6 of the cutter head 2 while the inside ring surface 50 of cutter ring 40 also tapers inwardly in a direction toward base surface 46 of base portion or toward surface 6 of the cutter head 2. Tapered inside ring surface 50 extends to base surface 46. Means, such as shoulder screw 32, hold the cutter head 2 to the centering disc 24. However, in this embodiment, resilient means, such as springs 34, are located between the head 64 of screw 32 and the centering disc 24 thus urging the centering disc toward the cutter head 2. The force of the springs 34 urges centering disc 24 toward the cutter head 2 until the tapered surfaces of the centering disc 24 and the cutter ring 40 are complementary at which point the cutter ring 40 will be centered on the cutter head 2.

In the embodiment of FIG. 5 the cutter ring 40 is secured to the cutter head 2 by the force exerted by the center bolt 62 which also serves to mount the rotary cutter to the spindle of a gear cutting machine. If desired, at least one additional securing means, such as screw 66, may be spaced about and extend through the centering disc 24 into the cutter head 2. Alternatively, screws extending through the cutter head 2 and into the base portion 44 of the cutter ring 40, as shown by 52 in FIG. 1, may also be utilized as additional securing means.

To radially align cutter ring 40 on cutter head 2 and to assist in the transmittal of torque from cutter head 2 to the cutter ring 40, a key and keyway arrangement may be utilized. In FIG. 5 this arrangement is shown by a key 56 which is located in a keyway 59 formed in the first side 6 of cutter head 2 at a depth of about one-half of the height of the key 56. The key 56 is secured to cutter head 2 by a means, such as threaded screw means 60, extending through the key and into the cutter head 2. The key 56 may be of a generally rectangular configuration with the width gradually tapering narrower toward each end. Key 56 is inserted into a generally rectangular keyway 58 located in the base surface 46 of the cutter ring 40. Alternatively, the key may be located in the base surface of the cutter ring 40 with the keyway located in the first side 6 of the cutter head. The key and keyway arrangement may also be included in the embodiment set forth by FIG. 1.

In the assembly of the rotary cutter of FIG. 5 the cutter ring 40 is first placed on cutter head 2. The centering disc 24 is then set into the bore of cutter ring 40 and placed into an interference fit with the ball and cage arrangement 22 thus centering the disc 24 on the cutter head 2. The centering disc 24 is then secured to the cutter head by shoulder screws 32 and the force of springs 34 urges the centering disc 24 toward cutter head 2 until the tapering surfaces of the centering disc 24 and the cutter ring 40 are complementary. The rotary cutter is then mounted to a machine spindle by center bolt 62 which along with securing the rotary cutter to the spindle also secures the cutter ring 40 to the cutter head 2.

In the same manner as described with reference to FIG. 1, the rotary cutter of FIG. 5 may also include the ball and cage arrangement 22 located, prior to assembly, either about projecting portion 16 of the cutter head 2 or in the centering disc 24 next to surface 30. Resilient means, discussed above, may also be included to urge the ball and cage arrangement 22 away from either the cutter head 2 or the centering disc 24 depending upon the initial location of the ball and cage 22. Also, ball and cage retaining means 54, 55 and/or 57, discussed above, may also be included in the embodiment of FIG. 5.

The clamping means 52 of FIG. 1 or clamping means 66 of FIG. 5 may be replaced or supplemented by the clamping means shown in FIGS. 6–12.

Figure 6:
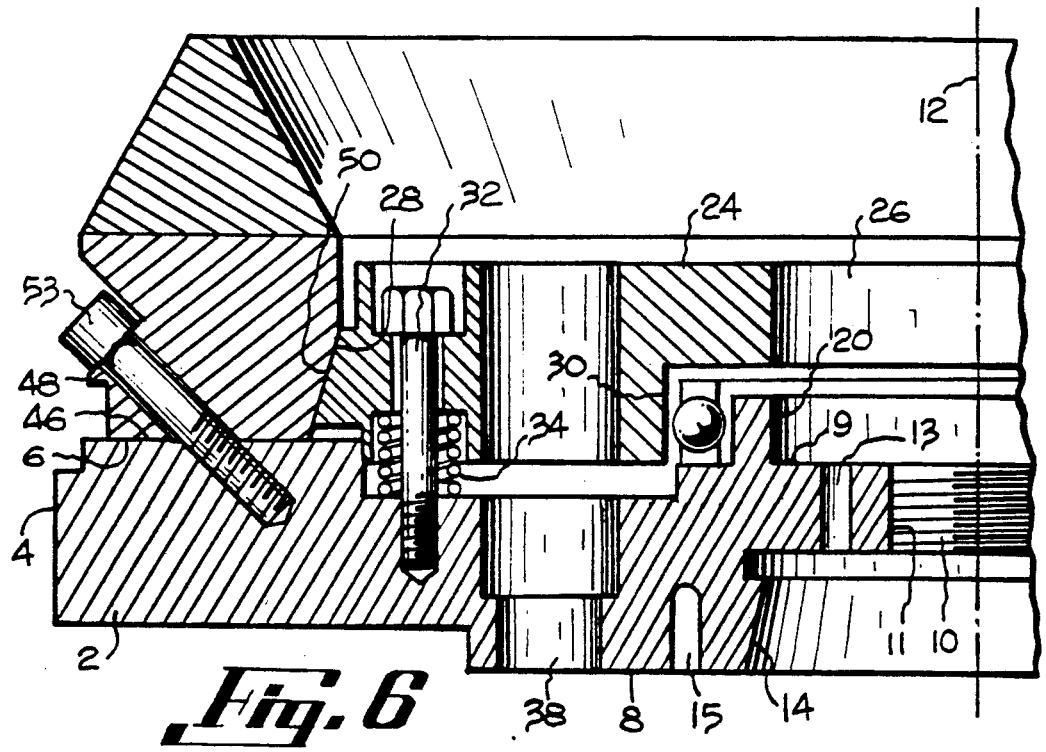
FIG. 6 schematically illustrates an alternative means for securing the cutter ring to the cutter head comprising means extending angularly through the base portion of the cutter ring, and engaging the cutter head.

FIG. 6 shows an alternative manner of securing the cutter ring 40 to the cutter head 2. In this embodiment, at least one securing means, such as screw 53, extends angularly with respect to the surface 6 of the cutter head 2 from the outside ring surface 48 through the base portion 44 of the cutter ring 40 and into engagement with the cutter head 2.

Figure 7:
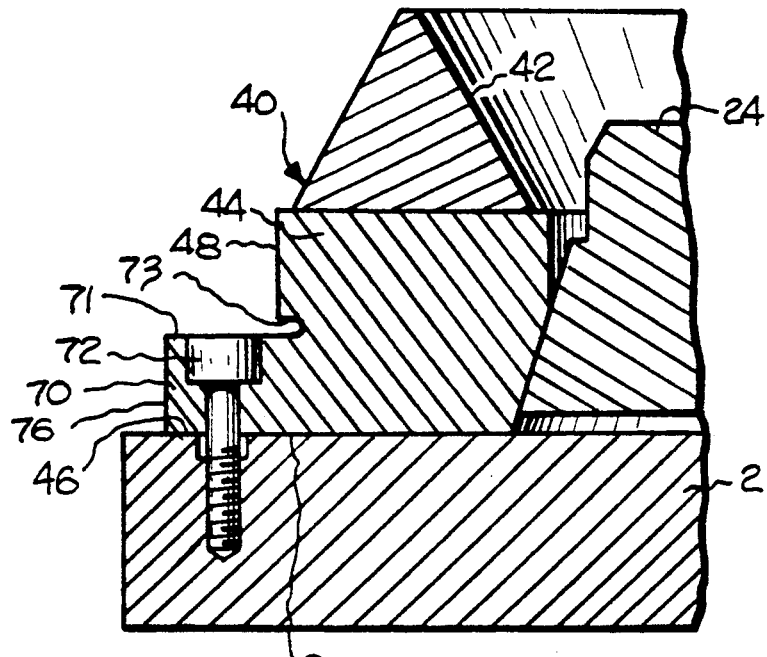
FIG. 7 schematically illustrates an alternative means for clamping the cutter ring to the cutter head comprising tabs or a continuous flange extending radially outwardly from the base portion and having a planar upper surface extending substantially parallel to the base surface of the cutter ring with securing means extending through the tabs or continuous flange into the cutter head.

In FIG. 7 the cutter ring 40 is secured to the cutter head 2 by a plurality of tabs 70 (only one of which is shown) projecting from the base portion 44 of the cutter ring 40. Preferably six to eight equidistantly spaced tabs are utilized. The tabs 70 may be formed as part of the base portion 44 or may be separate from the base portion 44 and secured thereto. The tabs 70 extend radially outwardly from the base portion 44 of cutter ring 40. It can be seen that placing the securing means outwardly from the base portion 44 necessarily requires providing a cutter head 2 of a diameter larger than that required for the cutter as shown in FIGS. 1 or 5 given the same cutter ring diameter. The tabs 70 in FIG. 7 comprise a substantially planar upper surface 71 which extends substantially parallel to the base surface 46 of cutter ring 40 and the first side surface 6 of cutter head 2. An undercut 73 may be provided at the intersection of the upper surface 71 and the outside ring surface 48 in order to provide the necessary clearance for a grinding wheel to adequately finish the complete length of the surfaces 71 and 48. A securing means 72, such as a screw, passes through a bore in each tab 70 and engages the cutter head 2. Wide, deep threads in the screws 72 and cutter head 2 allow for position changes of the cutter ring 40 on the cutter head 2 due to dimensional changes of the cutter ring 40.

Figure 8:
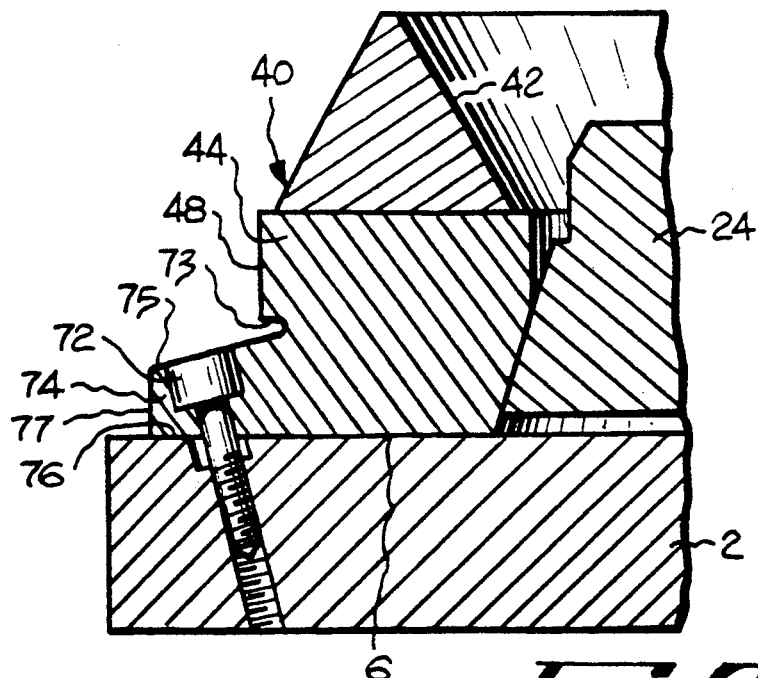
FIG. 8 schematically illustrates an alternative means for clamping the cutter ring to the cutter head comprising tabs or a continuous flange extending radially outwardly from the base portion and having a planar upper surface inclined angularly with respect to the base surface of the cutter ring with securing means extending through the tabs or continuous flange into the cutter head.

FIG. 8 represents a modification of FIG. 7 wherein the tabs 74 comprise a substantially planar upper surface 75 which is angularly inclined with respect to the base surface 46 and first side surface 6. The angle of inclination being greater than zero degrees but less than ninety degrees with respect to the base surface 46 of the cutter ring 40.

Figure 9:
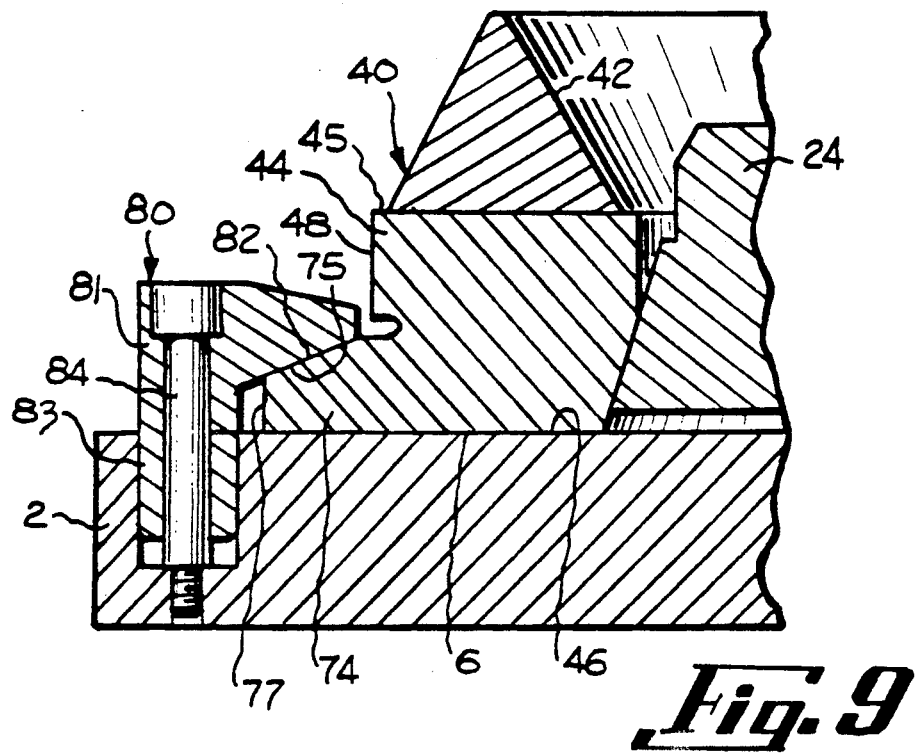
FIG. 9 illustrates an alternative means for securing the angular surface tabs or continuous flange of a cutter ring to a cutter head comprising clamps having angular clamping surfaces complementary to the surfaces of the tabs or flange.
Figure 10:
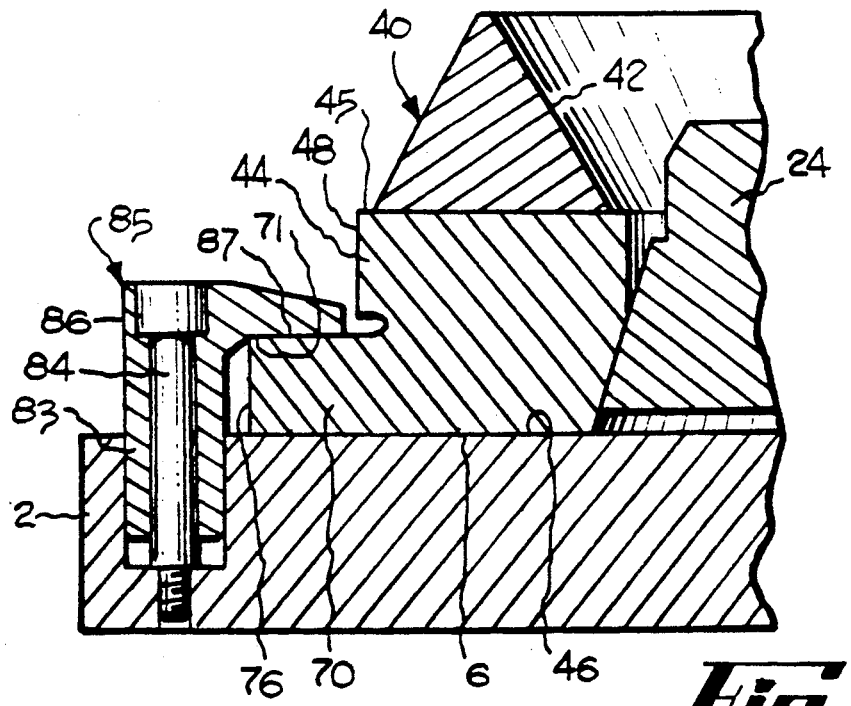
FIG. 10 illustrates an alternative means for securing the tabs or continuous flange of a cutter ring, having a clamping surface parallel to the cutter ring base surface, to a cutter head with the securing means comprising clamps having clamping surfaces complementary to the surfaces of the tabs or flange.

FIGS. 9 and 10 illustrate alternative means for securing the tabs to the cutter head. FIG. 9 shows a clamp 80 having a clamp head 81 and an angled clamping surface 82 which is complementary to and engages the upper surface 75 of tab 74 for securing the cutter ring 40 to the cutter head 2. The clamp 80 is pulled down by a means, such as a screw 84, which passes through the clamp head 81 and clamp sleeve 83, which is located in a bore in cutter head 2, and threadably engages the cutter head 2.

FIG. 10 illustrates a clamp 85 for use with tab 70 having upper surface 71 substantially parallel to base surface 46. Clamp 85 includes a clamp head 86 and clamping surface 87 which is complementary to and engages the upper surface 71 of tab 70. Similar to FIG. 9, clamp 85 is pulled down by means, such as screw 84, which extends through clamp head 86 and clamp sleeve 83 and threadably engages cutter head 2.

In FIGS. 9 and 10 there are a plurality of clamps spaced about the cutter head 2 with the number and position of the clamps corresponding to the number and position of the tabs on the cutter ring. Each tab is engaged by a clamp for securing the cutter ring 40 to the cutter head 2.

Alternative to the tabs 70 or 74, a continuous, circumferentially-extending flange may be utilized which extends completely around and is integral with the base portion 44 of the cutter ring 40. A cross-section of the continuous flange may also be represented by FIGS. 7 or 8. The flange may have an upper surface which is parallel to the base surface 46, similar to the upper surface 71 in FIG. 7, or the flange may have an angled surface similar to the upper surface 75 in FIG. 8. The flange may be secured to the cutter head 2 by screw means as shown in FIGS. 7 or 8, or, the flange may be clamped to the cutter head 2 by a plurality of clamps in a manner as shown by FIGS. 9 or 10.

Figure 11:
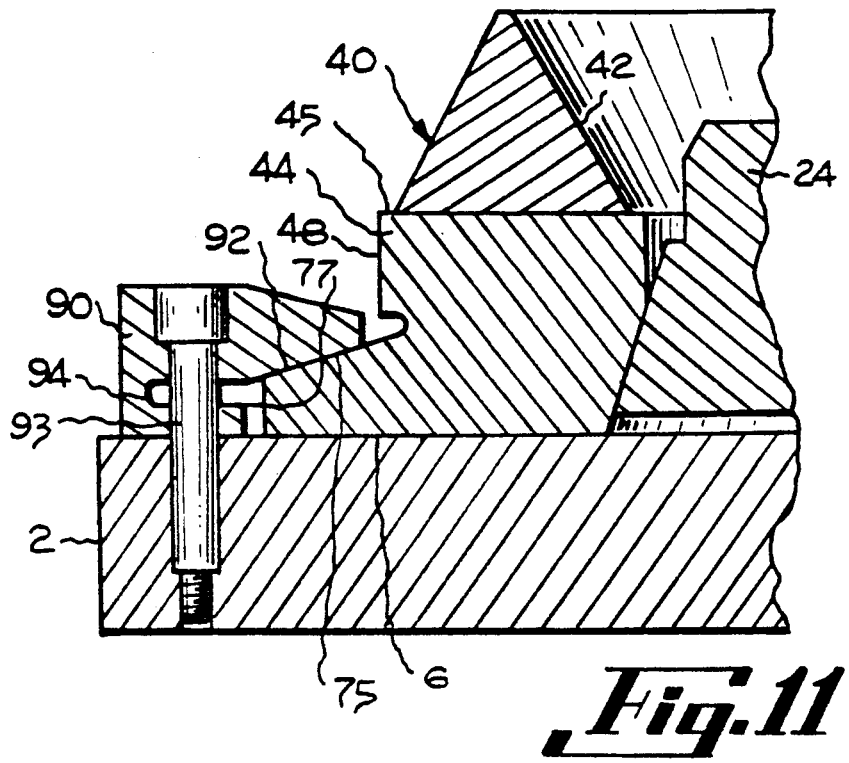
FIG. 11 illustrates a clamping ring or one of a plurality of clamps for securing the tabs or continuous flange of a cutter ring, having an angled clamping surface, to a cutter head.

The tabs or flange may also be secured to the cutter head 2 by a clamping ring which extends around the cutter ring. FIG. 11 shows the cross-section of a clamping ring 90 comprising an angled clamping surface 92 for engaging a complementary angled surface of a tab or flange. The clamping ring 90 is pulled down by a plurality of means, such as a screw 93, spaced about the clamping ring and extending therethrough and into cutter head 2. Slot 94 allows the clamping ring 90 to be deformed slightly as means 93 is tightened thus permitting clamping forces to be directed primarily to the clamping surface 92.

Figure 12:
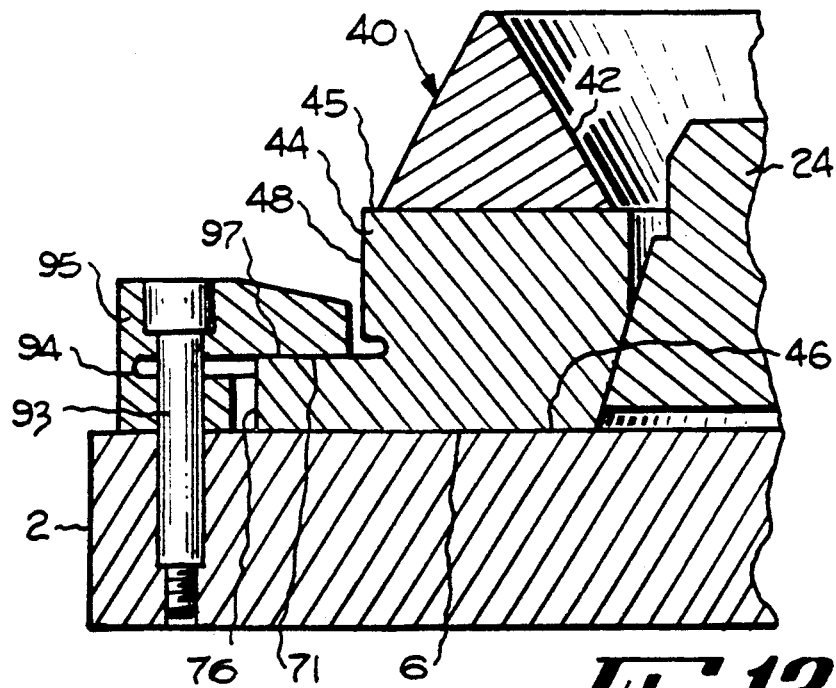
FIG. 12 illustrates a clamping ring or one of a plurality of clamps for securing the tabs or continuous flange of a cutter ring, having a clamping surface parallel to the cutter ring base surface, to a cutter head.

FIG. 12 shows another clamping ring 95 having a clamping surface 97 for engaging a complementary surface of a tab or flange having an upper clamping surface extending parallel to base surface 46. The clamping ring 95 also includes a slot 94 and is pulled down by a plurality of means, such as a screw 93, spaced about the clamping ring and extending therethrough and threadably engaging cutter head 2.

FIGS. 11 and 12 may also represent the cross-section of one of a plurality of clamps spaced about the cutter head 2. The individual clamps may be spaced such that the number and position of the clamps correspond to the number and position of tabs on the cutter ring 40. Alternatively, the clamps as represented by FIGS. 11 or 12 may also engage a continuous flange about a cutter ring 40 for securing the cutter ring 40 to the cutter head 2.

In cutter rings having outwardly extending tabs or a continuous flange as shown in FIGS. 7 and 8 it is not possible to have proof surfaces 47 or 49 as shown in FIGS. 1-6. In these embodiments the outer surfaces of the tabs or flange are precisely formed and serve as the proof surfaces. In FIG. 7, surfaces 71 and 76 are utilized as proof surfaces while in FIG. 8, surfaces 75 and 77 function as proof surfaces. Although surface 75 is oriented angularly with respect to the axis of rotation, it may still serve as a proof surface.

In FIGS. 9-12 the tabs or flanges are not easily accessible due to the presence of the clamps 80 or 85 or clamping rings 90 or 95 and therefore can not function as proof surfaces. In these instances, outer cutter ring surface 48 is selected as a proof surface extending parallel to the axis of rotation. Cutter ring base portion 44 is formed to be wider than the widest portion of the stock removing surface 42 such that an outer shoulder portion 45 is formed. This outer shoulder portion 45 is perpendicular to the axis of rotation of the cutter ring and serves as the other proof surface.

The rotary cutter of the present invention represents a rapid and less complicated manner to assemble and disassemble a rotary cutter. The present invention also represents a means to ensure that the stock removing surfaces of the rotary cutter rotate true about the axis thereof even in situations where cutter ring diameters may vary, such as due to temperature changes causing thermal expansion or contraction of the cutter ring.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A ring-shaped cutter designed for cutting gears and the like, said cutter having an axis of rotation and being adapted to maintain a centered position when mounted on a mounting assembly carried by a gear cutting machine, said mounting assembly including a cutter head and a centering disc with said centering disc having a tapered outer edge surface, said ring-shaped cutter comprising:
a circular base portion,
said circular base portion having a base surface, a top surface, an outside ring surface and a tapered inside ring surface, said tapered inside ring surface extending to said base surface,
at least one stock removing surface being arranged on said top surface,
means to attach said ring-shaped cutting to said mounting assembly, said tapered inside ring surface being complementary with said tapered outside edge surface and positionable in an abutting manner thereon, said ring-shaped cutter being automatically centered on said mounting assembly with said tapered inside ring surface positionable along the length of said tapered outer edge surface regardless of ring-shaped cutter diameter expansion or contraction.

2. The ring-shaped cutter of claim 1 wherein said inside ring surface tapers outwardly in a direction toward said base surface.

3. The ring-shaped cutter of claim 2 wherein the amount of taper is about 2 degrees to about 20 degrees.

4. The ring-shaped cutter of claim 1 wherein said inside ring surface tapers inwardly in a direction toward said base surface.

5. The ring-shaped cutter of claim 1 wherein said at least one stock removing surface comprises cutting blades.

6. The ring-shaped cutter of claim 1 wherein said at least one stock removing surface comprises a grinding surface.

7. The ring-shaped cutter of claim 1 wherein said at least one stock removing surface and said base portion comprise a single, solid unit.

8. The ring-shaped cutter of claim 1 wherein said at least one stock removing surface is removably attached to said base portion.

9. The ring-shaped cutter of claim 1 further comprising proof surfaces.

10. The ring-shaped cutter of claim 1 wherein said means to attach comprises threads extending into said base portion from said base surface.

11. The ring-shaped cutter of claim 1 wherein said means to attach comprises means extending angularly through said base portion.

12. The ring-shaped cutter of claim 1 wherein said means to attach comprises a plurality of tabs extending radially outwardly from said base portion.

13. The ring-shaped cutter of claim 12 wherein said tabs include a substantially planar upper surface extending substantially parallel to said base surface.

14. The ring-shaped cutter of claim 12 wherein said tabs include a substantially planar upper surface which is angularly inclined with respect to said base surface.

15. The ring-shaped cutter of claim 1 wherein said means to attach comprises a continuous circumferential flange extending radially outwardly from said outside ring surface.

16. The ring-shaped cutter of claim 1 wherein said base surface further includes a key or keyway.

17. The ring-shaped cutter designed for cutting gears, couplings and the like, said cutter being adapted to maintain a centered position when mounted on a mounting assembly carried by a cutting machine, said mounting assembly having an axis of rotation and including a cutter head and a centering disc with said centering disc having a tapered outer edge surface, said ring-shaped cutter adapted to rotate true in the axial plane and the radial plane of said axis, said ring-shaped cutter comprising:

a circular base portion, said circular base portion having a base surface, a top surface, an outside ring surface and an outwardly tapering inside ring surface extending to said base surface, said tapering being outwardly in a direction toward said base surface, at least one stock removing surface being arranged on said top surface, at least one bore in said base portion for passage of a securing means thereinto for securing said ring-shaped cutter to said mounting assembly, said tapered inside ring surface being complementary with said tapered outer edge surface and positionable in an abutting manner thereon, said ring-shaped cutter being automatically centered on said mounting assembly with said tapered inside ring surface positionable along the length of said tapered outer edge surface regardless of variations in the diameter of said ring-shaped cutter.

18. The ring-shaped cutter of claim 17 wherein said at least one stock removing surface comprises cutting blades.

19. The ring-shaped cutter of claim 18 wherein said cutter is a roughing cutter.

20. The ring-shaped cutter of claim 17 wherein said cutter is a finishing cutter.

21. A ring-shaped cutter designed for cutting gears and the like, said cutter having an axis of rotation and being adapted to maintain a centered position when mounted on a mounting assembly carried by a gear cutting machine, said mounting assembly including a cutter head and a centering disc with said centering disc having a tapered outer edge surface, said ring-shaped cutter comprising:

at least one stock removing surface located on a circular base portion, said circular base portion having a base surface, an outside ring surface and a tapered inside ring surface, means to attach said ring-shaped cutter to said mounting assembly wherein said means to attach comprises threads extending into said base portion from said base surface, said tapered inside ring surface being complementary with said tapered outer edge surface and positionable in an abutting manner thereon, said ring-shaped cutter being automatically centered on said mounting assembly with said tapered inside ring surface positionable along the length of said tapered outer edge surface regardless of ring-shaped cutter diameter expansion or contraction.

22. A ring-shaped cutter designed for cutting gears and the like, said cutter having an axis of rotation and being adapted to maintain a centered position when mounted on a mounting assembly carried by a gear cutting machine, said mounting assembly including a cutter head and a centering disc with said centering disc having a tapered outer edge surface, said ring-shaped cutter comprising:

at least one stock removing surface located on a circular base portion, said circular base portion having a base surface, an outside ring surface and a tapered inside ring surface, means to attach said ring-shaped cutter to said mounting assembly wherein said means to attach comprises at least one of (a) threads extending into said base portion from said base surface, (b) means extending angularly through said base portion, (c) a plurality of tabs extending radially outwardly from said base portion, and, (d) a continuous circumferential flange extending radially outwardly from said outside ring surface, said tapered inside ring surface being complementary with said tapered outer edge surface and positionable in an abutting manner thereon, said ring-shaped cutter being automatically centered on said mounting assembly with said tapered inside ring surface positionable along the length of said tapered outside edge surface regardless of ring-shaped cutter diameter expansion or contraction.

23. A ring-shaped cutter designed for cutting gears and the like, said cutter having an axis of rotation and being adapted to maintain a centered position when mounted on a mounting assembly carried by a gear cutting machine, said mounting assembly including a cutter head and a centering disc with said centering disc having a tapered outer edge surface, said ring-shaped cutter comprising:

at least one stock removing surface located on a circular base portion, said circular base portion having a base surface, an outside ring surface and a tapered inside ring surface wherein said inside ring surface tapers inwardly in a direction toward said base surface, means to attach said ring-shaped cutter to said mounting assembly, said tapered inside ring surface being complementary with said tapered outer edge surface and positionable in an abutting manner thereon, said ring-shaped cutter being automatically centered on said mounting assembly with said tapered inside ring surface positionable along the length of said tapered outer edge surface regardless of ring-shaped cutter diameter expansion or contraction.

* * * * *